US009104901B2

(12) United States Patent
Minteer et al.

(10) Patent No.: US 9,104,901 B2
(45) Date of Patent: Aug. 11, 2015

(54) ELECTRONIC DEVICE INCLUDING INTERLEAVED BIOMETRIC SPOOF DETECTION DATA ACQUISITION AND RELATED METHODS

(71) Applicant: Apple Inc., Cupertino, CA (US)

(72) Inventors: Gregory T. Minteer, Cupertino, CA (US); Patrick J. Landy, Cupertino, CA (US); Ondrej Konopka, Bohemia (CZ)

(73) Assignee: APPLE INC., Cupertino, CA (US)

( * ) Notice: Subject to any disclaimer, the term of this patent is extended or adjusted under 35 U.S.C. 154(b) by 52 days.

(21) Appl. No.: 13/837,296

(22) Filed: Mar. 15, 2013

(65) Prior Publication Data

US 2014/0270416 A1 Sep. 18, 2014

(51) Int. Cl.
G06K 9/00 (2006.01)

(52) U.S. Cl.
CPC .................................. G06K 9/0012 (2013.01)

(58) Field of Classification Search
None
See application file for complete search history.

(56) References Cited

U.S. PATENT DOCUMENTS

| 5,940,526 | A | | 8/1999 | Setlak et al. |
| 5,953,441 | A | * | 9/1999 | Setlak ........................... 340/5.83 |
| 5,963,679 | A | | 10/1999 | Setlak |
| 5,995,630 | A | * | 11/1999 | Borza ............................... 380/54 |
| 6,088,471 | A | | 7/2000 | Setlak et al. |
| 6,289,114 | B1 | | 9/2001 | Mainguet |
| 6,628,812 | B1 | | 9/2003 | Setlak et al. |
| 6,927,581 | B2 | | 8/2005 | Gozzini |
| 7,361,919 | B2 | | 4/2008 | Setlak |
| 7,505,613 | B2 | | 3/2009 | Russo |
| 7,555,650 | B1 | * | 6/2009 | Zhao et al. .................... 713/176 |
| 7,697,281 | B2 | | 4/2010 | Dabov et al. |
| 7,697,729 | B2 | | 4/2010 | Howell et al. |
| 7,715,593 | B1 | | 5/2010 | Adams et al. |
| 7,734,068 | B2 | | 6/2010 | Fisher |
| 7,809,168 | B2 | | 10/2010 | Abiko et al. |
| 8,005,276 | B2 | | 8/2011 | Dean et al. |
| 8,145,916 | B2 | | 3/2012 | Boshra et al. |
| 2002/0126881 | A1 | * | 9/2002 | Langley ........................ 382/124 |
| 2003/0123714 | A1 | | 7/2003 | O'Gorman et al. |
| 2004/0230810 | A1 | | 11/2004 | Hillhouse |
| 2006/0115128 | A1 | * | 6/2006 | Mainguet ...................... 382/115 |
| 2006/0204061 | A1 | * | 9/2006 | Mainguet ...................... 382/124 |
| 2007/0014443 | A1 | * | 1/2007 | Russo ........................... 382/124 |
| 2008/0219522 | A1 | | 9/2008 | Hook |
| 2009/0083850 | A1 | | 3/2009 | Fadell et al. |

(Continued)

FOREIGN PATENT DOCUMENTS

EP 1678655 7/2006

OTHER PUBLICATIONS

Abhyankar et al., Fingerprint Liveness Detection Using Local Ridge Frequencies and Multiresolution Texture Analysis Techniques, Proc. Int Conf. Image Processing, 2006 pp. 1-4.

*Primary Examiner* — Nirav G Patel
*Assistant Examiner* — Ian Lemieux
(74) *Attorney, Agent, or Firm* — Allen, Dyer, Doppelt, Milbrath & Gilchrist, P.A.

(57) ABSTRACT

An electronic device may include an array of finger sensing pixels and data acquisition circuitry coupled to the array. The data acquisition circuitry may be capable of acquiring finger biometric data from each sub-array of the array, and acquiring spoof detection data from at least one of the sub-arrays in an interleaved fashion with the finger biometric data.

17 Claims, 4 Drawing Sheets

(56) References Cited

U.S. PATENT DOCUMENTS

| | | |
|---|---|---|
| 2009/0316963 A1 | 12/2009 | Boshra |
| 2010/0082444 A1 | 4/2010 | Lin et al. |
| 2010/0119124 A1* | 5/2010 | Satyan ........................... 382/124 |
| 2010/0321158 A1 | 12/2010 | Setlak et al. |
| 2011/0074443 A1* | 3/2011 | Martinsen et al. ............ 324/649 |
| 2011/0102569 A1 | 5/2011 | Erhart |
| 2011/0175703 A1* | 7/2011 | Benkley, III ................. 340/5.82 |
| 2012/0134549 A1 | 5/2012 | Benkley, III |

* cited by examiner

ELECTRONIC DEVICE INCLUDING INTERLEAVED BIOMETRIC SPOOF DETECTION DATA ACQUISITION AND RELATED METHODS

FIELD OF THE INVENTION

The present invention relates to the field of electronics, and, more particularly, to the field of finger sensors and related methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,963,679 to Setlak et al. and assigned to the assignee of the present invention. The fingerprint sensor is an integrated circuit sensor that drives the user's finger with an electric field signal and senses the electric field with an array of electric field sensing pixels on the integrated circuit substrate. Such sensors are used to control access for many different types of electronic devices such as computers, cell phones, personal digital assistants (PDA's), and the like. In particular, fingerprint sensors are used because they may have a small footprint, are relatively easy for a user to use and they provide reasonable authentication capabilities.

Another significant advance in finger sensing technology is disclosed in U.S. Pat. No. 5,953,441 also to Setlak et al., assigned to the assignee of the present invention, and the entire contents of which are incorporated by reference. This patent discloses a fingerprint sensor including an array of impedance sensing elements for generating signals related to an object positioned adjacent thereto, and a spoof reducing circuit for determining whether or not an impedance of the object positioned adjacent the array of impedance sensing elements corresponds to a live finger to thereby reduce spoofing of the fingerprint sensor by an object other than a live finger. A spoofing may be indicated and/or used to block further processing. The spoof reducing circuit may detect a complex impedance having a phase angle in a range of about 10 to 60 degrees corresponding to a live finger. The fingerprint sensor may include a drive circuit for driving the array of impedance sensing elements, and a synchronous demodulator for synchronously demodulating signals from the array of impedance sensing elements.

"Spoof" fingerprints are typically made using natural and artificial materials, such as gelatin, gum, gummy bears, meat products, clay, Play-Doh, auto body filler, resins, metal, etc. that can be used to imitate the ridges and valleys present in a real fingerprint. As it is desirable to be able to acquire a fingerprint image under any skin condition (dry, moist, etc.) some fingerprint sensors employ real-time gain and other adjustments to obtain the best possible images. In doing so, sensors that detect fingerprints using these approaches are sometimes susceptible to attack using spoofs because these systems are capable of imaging widely varying skin conditions (and other materials).

Spoof detection approaches can be broadly classified into hardware and software based approaches. Hardware based approaches typically involve coupling a biometric device to a finger sensor. For example, previous work in the area of spoof detection and reduction may be considered as having used: A.) impedance classification: determining the impedance characteristics of a material over some frequency range; B.) optical dispersion characteristics; C.) thermal measurements; D.) phase setting and signal amplitude; and E.) finger settling detection. In contrast, a software based approach to spoof detection may not involve changes or additions to a finger sensor. A software based approach may involve additional comparisons of finger samples from a user.

Abhyankar et al., Fingerprint Liveness Detection Using Local Ridge Frequencies and Multiresolution Texture Analysis Techniques, *Proc. Int. Conf. Image Processing*, 2006, discloses adopting statistical features obtained through multi-resolution texture and local-ridge frequency analysis. Classification is performed using a fuzzy c-means classifier. U.S. Pat. No. 7,505,613 to Russo, also assigned to the present assignee, discloses a method of finger spoof detection that is similar to Abhyankar et al., but adds user adaptability.

SUMMARY OF THE INVENTION

In view of the foregoing background, it is therefore an object of the present invention to provide an electronic device having increased security.

This and other objects, features, and advantages in accordance with the present invention are provided by an electronic device that may include an array of finger sensing pixels and data acquisition circuitry coupled to the array of finger sensing pixels. The data acquisition circuitry may be capable of acquiring finger biometric data from each of a plurality of sub-arrays of the array of finger sensing pixels. The data acquisition circuitry may also be capable of acquiring spoof detection data from at least one of the plurality of sub-arrays in an interleaved fashion with the finger biometric data. Accordingly, the electronic device may advantageously provide increased security, for example, by making it increasingly difficult to switch between a "live" finger and a "spoof" finger while acquiring finger biometric data.

The acquisition circuitry may include a biometric reading chain capable of acquiring the finger biometric data for each finger sensing pixel in a given sub-array, for example. A spoof reading chain may be capable of bussing together respective finger sensing pixels in the given sub-array and acquiring spoof detection data therefrom.

The biometric reading chain may include at least one first amplifier and scanning circuitry associated therewith. The spoof reading chain may include at least one second amplifier and bussing circuitry associated therewith, for example.

The spoof reading chain may be capable of sensing an impedance of a finger positioned adjacent the array of finger sensing pixels, for example. The data acquisition circuitry may further include finger drive circuitry coupled to the array of finger sensing pixels. The finger drive circuitry may include a finger drive electrode adjacent the array of finger sensing pixels and a pulse generator coupled between the finger drive electrode and the array of finger sensing pixels.

The electronic device may further include a processor coupled to the data acquisition circuitry and capable of determining a finger match and a live finger based upon the finger biometric data and spoof data, respectively, for example.

Each of the finger sensing pixels may include an electric field finger sensing pixel, for example. The data acquisition circuitry may be capable of acquiring spoof detection data from each of the plurality of sub-arrays. The array of finger sensing pixels may define a rectangle, for example, and each of the sub-arrays may extend across a side of the rectangle.

A method aspect is directed to a method of spoof detection. The method may include using data acquisition circuitry coupled to an array of finger sensing pixels to acquire finger biometric data from each of a plurality of sub-arrays of the array of finger sensing pixels. The method may also include using the data acquisition circuitry to acquire spoof detection data from at least one of the plurality of sub-arrays in an interleaved fashion with the finger biometric data.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
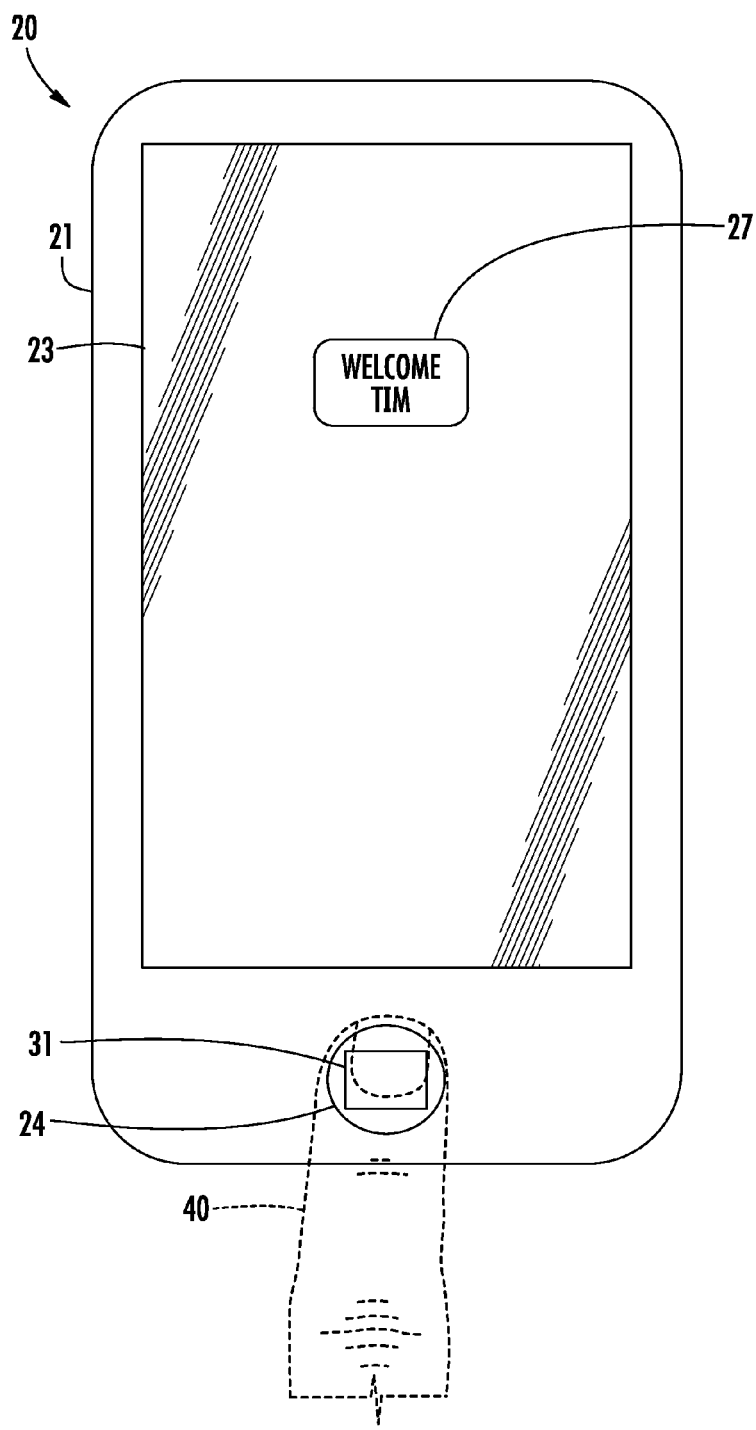
FIG. 1 is a plan view of an electronic device according to the present invention.
Figure 2:
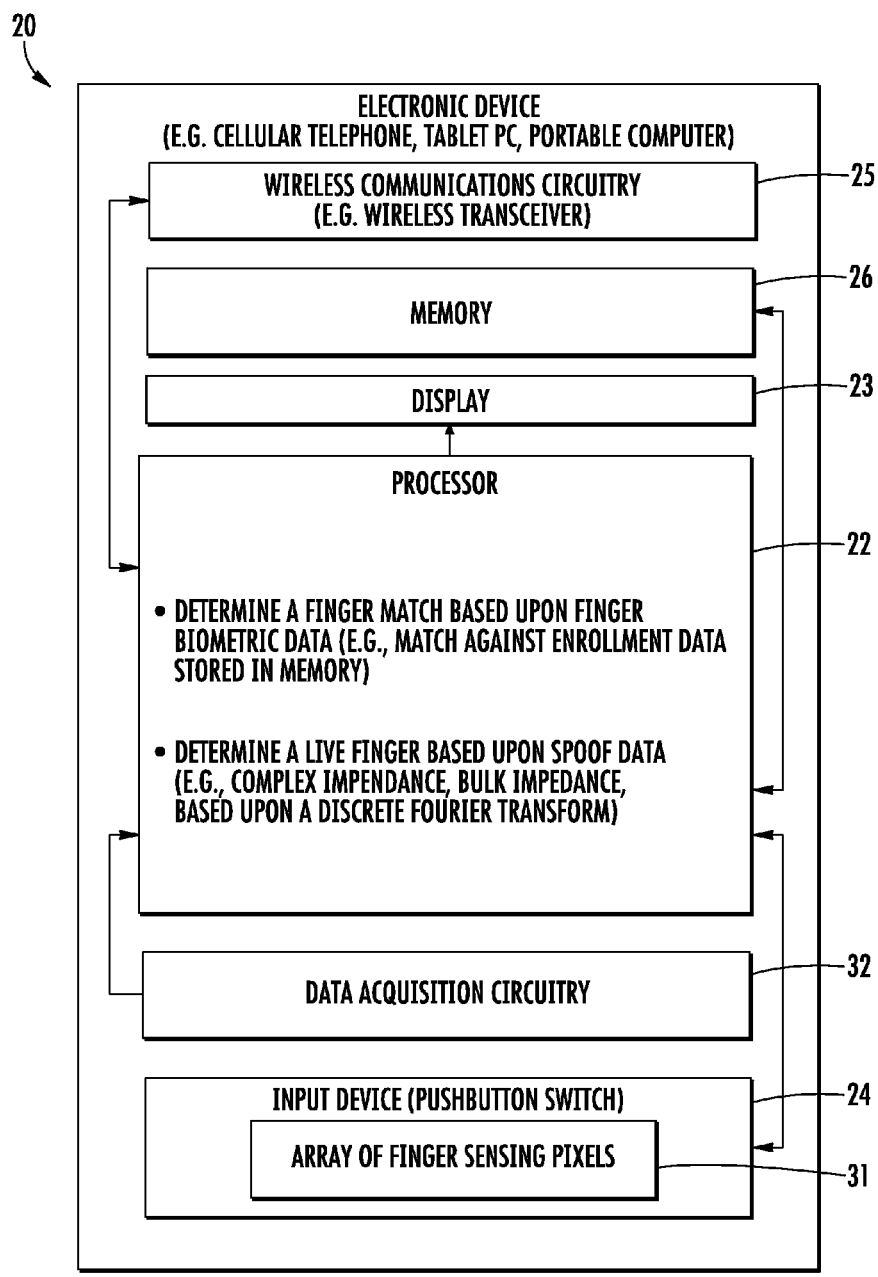
FIG. 2 is a schematic block diagram of a portion of the electronic device of FIG. 1.
Figure 3:
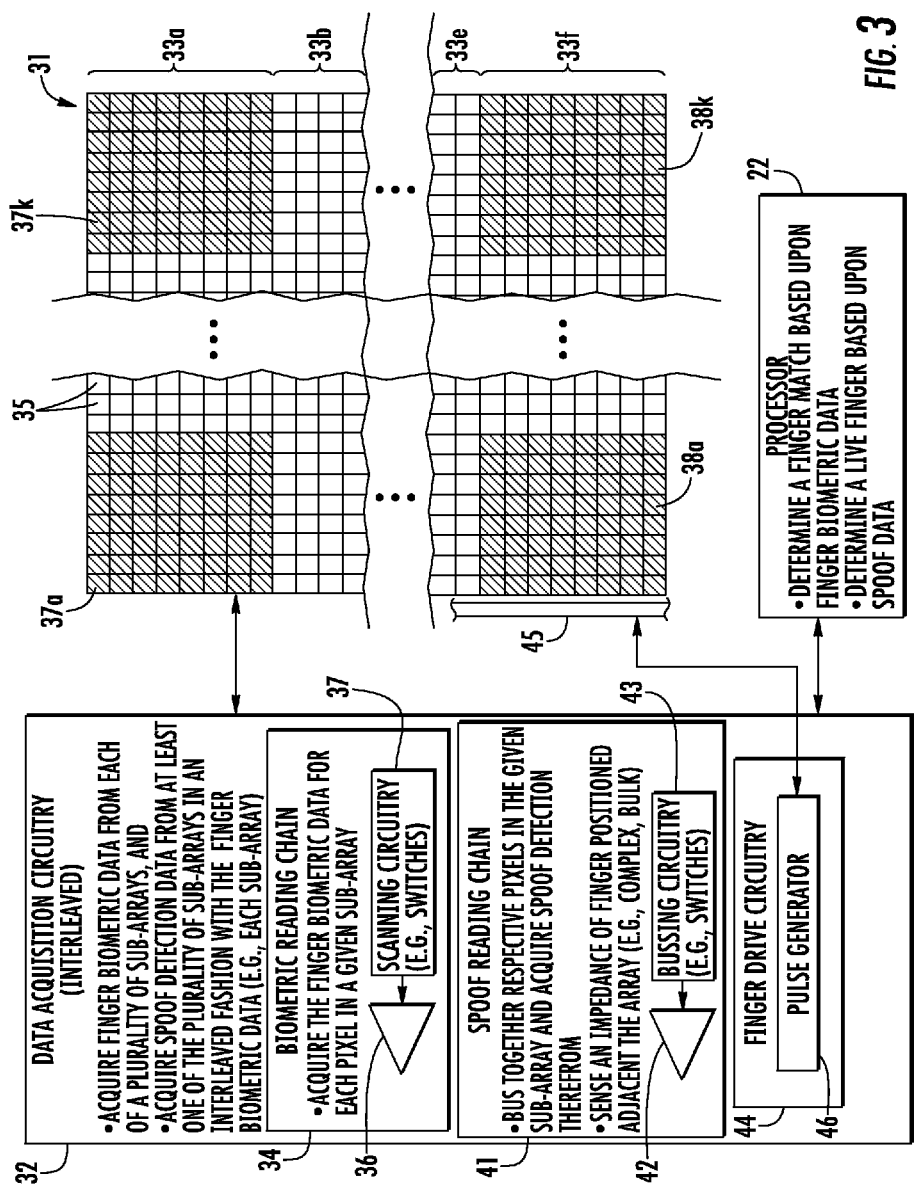
FIG. 3 is another schematic block diagram of a portion of the electronic device of FIG. 1.

Referring initially to FIGS. 1-3, an electronic device 20 is now described. The electronic device 20 illustratively includes a portable housing 21 and a processor 22 carried by the portable housing. The electronic device 20 is illustratively a mobile wireless communications device, for example, a cellular telephone. The electronic device 20 may be another type of electronic device, for example, a tablet computer, laptop computer, etc.

Wireless communications circuitry 25 (e.g. a wireless transceiver, cellular, WLAN Bluetooth, etc.) is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25.

A display 23 is also carried by the portable housing 21 and is coupled to the processor 22. The display 23 may be a liquid crystal display (LCD), for example, or may be another type of display, as will be appreciated by those skilled in the art. A memory 26 is also coupled to the processor 22.

A finger-operated user input device 24, illustratively in the form of a pushbutton switch, is also carried by the portable housing 21 and is coupled to the processor 22. The pushbutton switch 24 cooperates with the processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24. In some embodiments, the finger-operated user input device 24 may be a different type of finger-operated user input device, for example, forming part of a touch screen display. Other or additional finger-operated user input devices may be carried by the portable housing 21.

An array of finger sensing pixels 31 is carried by the pushbutton switch 24 to sense a user's finger 40 or an object placed adjacent the array of finger sensing pixels. The array of finger sensing pixels 31 is carried by the pushbutton switch 24 so that when a user or object contacts and/or presses downward on the pushbutton switch, data from the user's finger 40 is acquired, for example, for finger matching and/or spoof detection, as will described in further detail below. In other words, the array of finger sensing pixels 31 may cooperate with circuitry, as will be explained in further detail below, to be responsive to static contact or placement of the user's finger 40 or object. Of course, in other embodiments, for example, where the array of finger sensing pixels 31 is not carried by a pushbutton switch, the array of finger sensing pixels may cooperate with circuitry to be responsive to sliding contact (i.e. a slide sensor), or responsive to static placement (i.e. a standalone static placement sensor).

The array of finger sensing pixels 31 is illustratively an 88×88 array of finger sensing pixels. In other words, conceptually, the array of can be organized into 88 rows of 88 pixels and defines a rectangle. Of course, in some embodiments, the array of finger sensing pixels 31 may be a different size. Each finger sensing pixel 35 may be an electric field sensing pixel such as disclosed in U.S. Pat. No. 5,940,526 to Setlak et al., assigned to the present assignee, and the entire contents of which are herein incorporated by reference. Of course, in some embodiments, each finger sensing pixel 35 may another type of finger sensing pixel.

The electronic device 20 also includes data acquisition circuitry 32 coupled to the array of finger sensing pixels 31. The data acquisition circuitry 32 is capable of acquiring finger biometric data from each of a plurality of sub-arrays 33a-33f of the array of finger sensing pixels 31. The data acquisition circuitry 32 illustratively includes a biometric reading chain 34 capable of acquiring the finger biometric data for each pixel in a given sub-array 33a-33f. The biometric reading chain 34 includes first amplifier 36 and scanning circuitry associated therewith 37. One or more additional first amplifiers may be used, as will be appreciated by those skilled in the art.

Illustratively, for the 88×88 array of finger sensing pixels 31, each sub-array 33a-33f includes 8 rows of 88 pixels (i.e., 11 sub-arrays). In other words, each of the sub-arrays 33a-33f extends across a side of the rectangle. Of course, each sub-array 33a-33f may include a different amount of pixels 35 and may be in a different configuration. For example, in some embodiments, it may be particularly desirable to have each sub-array 33a-33f have less than 10% of a total of finger sensing pixels 35 in the array of finger sensing pixels 31. Each sub-array 33a-33f may be divided in 8×8 regions 37a, 37k, 38a, 38k. The finger sensing pixels 35 of each sub-array 33a-33f may be acquired by region. In other words, finger biometric data in each sub-array 33a-33f may be acquired by scanning across the regions 37a, 37k, 38a, 38k. In some embodiments, the finger biometric data from the sub-arrays 33a-33f may be averaged to reduce noise.

The data acquisition circuitry 32 is also capable of acquiring spoof detection data from the sub-arrays 33a-33f in an interleaved fashion with the finger biometric data. The spoof detection data may be impedance data, for example, complex or bulk impedance data.

A spoof reading chain 41 is capable of bussing together respective pixels 35 in the given sub-array 33a-33f and acquiring spoof detection data therefrom. The spoof reading chain 41 includes a second amplifier 42 and bussing circuitry 43 associated therewith. One or more additional second amplifiers may be used, as will be appreciated by those skilled in the art. The bussing circuitry 43 may include switches, for example, for bussing together pixels in the given sub-array 33a-33f for the acquisition of the spoof detection data.

In some embodiments, the data acquisition circuitry 32 may be capable of acquiring spoof detection data corresponding to each acquisition of finger biometric data. Of course, the spoof detection data may be interleaved with the finger biometric data in other or additional acquisition configurations.

The data acquisition circuitry 32 also includes finger drive circuitry 44 coupled to the array of finger sensing pixels 31. The finger drive circuitry 44 includes a finger drive electrode 45 adjacent the array of finger sensing pixels 31, and a pulse generator 46 coupled between the finger drive electrode and the array of finger sensing pixels. The pulse generator 46 may generate a square wave, for example, a 16V square wave at a frequency of about 1.5 MHz that may be used to drive the user's finger 40 or object when positioned adjacent the array of finger sensing pixels 35. By driving the user's finger 40, those skilled in the art will understand that in some embodiments, it is meant that instead of driving the user's finger with a drive signal, the user's finger may be grounded while the circuitry associated with and/or array of finger sensing pixels 31 may be driven with the drive signal. Of course, the pulse generator 46 may generate a pulse having another shape, frequency, and/or amplitude.

The acquisition of spoof data is calculated from the rising edge of the pulse from the pulse generator 46. In particular, the reading chain 41 busses together the finger sensing pixels 35 in a given sub-array 33a-33f and acquires about 50-100 spoof measurement data samples to be used for an impedance measurement. The falling edge of the pulse may also be used to acquire the acquisition of spoof data.

In some embodiments, the samples or spoof detection data may be sent to the processor 22 (i.e., host processor) for processing. The processor 22 may determine, whether the object positioned adjacent the array of finger sensing pixels 31 have characteristics indicative of a spoof based upon a response step size, for example. The response step size or pulse size may be determined by calculating the difference between the amplitude after the step or pulse has settled and the amplitude prior to the step or pulse being applied.

The processor 22 may also determine whether the object positioned adjacent the array of finger sensing pixels 31 has characteristics indicative of a spoof based upon a response rise time. The response rise time may be measured between 10% and 90% of the sampled response. The processor 22 may further determine whether the object positioned adjacent the array of finger sensing pixels 31 has characteristics indicative of a spoof based upon performing a frequency response analysis. For example, a derivative of the samples of spoof detection data may be taken and the results are subject to a fast Fourier transform (FFT). The derivative of the response is the impulse response of the user's finger or object. A discrete Fourier transform (DFT) of the 50-100 samples of spoof detection data for the sub-array may also be calculated to determine whether the object positioned adjacent the array of finger sensing pixels 31 has characteristics indicative of a spoof. In other words, the processor 22 determines whether the user's finger 40 or object is a "live finger" i.e., not a spoof. For example, the processor 22 may make a spoof determination several times in the sensing of a given user's finger 40 or object (e.g. 10-11 times for the 88×88 array of finger sensing pixels described above). Additionally, similar to the acquisition of finger biometric data, the acquired spoof detection data may be averaged to reduce noise.

Of course, any of the techniques described above may be used individually or together along with other or additional spoof determining techniques. For example, the processor 22 may cooperate with the array of finger sensing pixels 31 and the finger drive electrode 45 to determine whether the object has characteristics of a spoof based upon a differential sensing. Moreover, the drive signal or the pulse from the pulse generator 46 may have its output impedance, common mode level, and/or slew rate controlled or adopted for different fingers or conditions. Calibration techniques may also be used with respect to the drive signal.

Additionally, the processor 22 may determine a finger match based upon the finger biometric data. In other words, in some embodiments, the finger biometric data may be matched against enrolled finger biometric data, for example, to permit access to the electronic device 20, enable certain functionality, and/or perform certain functions, as will be appreciated by those skilled in the art. Of course, the processor 22 may use other techniques to determine whether the user's finger 40 or object is "live" or a spoof as will be appreciated by those skilled in the art.

Also, in some embodiments, the finger sensor or finger sensing circuitry can be integrated on one or more integrated circuits as will be appreciated by those skilled in the art. The spoof detection data may not be sent to the processor 22 (i.e., a host processor) and may be processed using a finger sensing processor or circuitry included on the finger sensing integrated circuit (IC).

Advantageously, by acquiring spoof detection data from the sub-arrays 33a-33f in an interleaved fashion with the finger biometric data, for example, used for matching, the chances of passing off a spoof, for example, from a latent image, may be decreased, thus increasing security. In other words, the interleaving of spoof detection data may make it increasingly difficult to switch between a "live" finger and a "spoof" finger.

Figure 4:
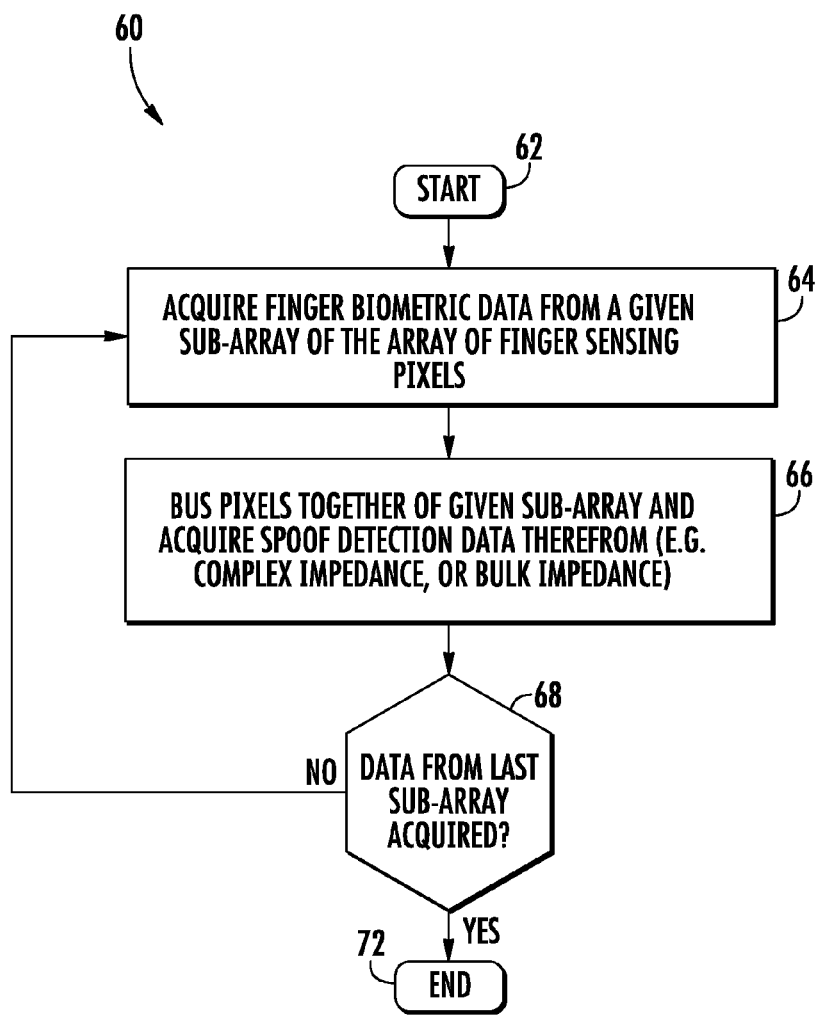
FIG. 4 is a flowchart of a method of spoof detection in accordance with the present invention.

Referring now to the flowchart 60 in FIG. 4, beginning at Block 62, the associated method of spoof detection is now described. Upon placement of the user's finger 40 or object adjacent the array of finger sensing pixels 31, data acquisition circuitry 32 coupled to the array of finger sensing pixels acquires finger biometric data from a given sub-array 33a-33f of the array of finger sensing pixels (Block 64). After each acquisition of the finger biometric data the given sub-array 33a-33f, the data acquisition circuitry 32 busses pixels together of the given sub-array and acquires spoof detection data from the given sub-array 33a-33f (Block 66). After acquiring spoof detection data from the given sub-array 33a-33f, a determination is made as to whether data from the last sub-array 33a-33f or the end of the array of finger sensing pixels has been acquired. (Block 68). If the data from the last sub-array 33a-33f has been acquired, then the method ends at Block 72. Alternatively, if there are more sub-arrays 33a-33f from which to acquire data, the data acquisition circuitry 32 acquires finger biometric data from the next sub-array (Block 64) and spoof detection data (Block 66) from the next sub-array so that the spoof detection data is acquired in an interleaved fashion with the finger biometric data. The process continues until finger biometric data and spoof detection data from the last sub-array 33a-33f have been acquired, when the method ends at Block 72.

It should be understood that while the embodiments described may be particularly useful for both spoof detecting and matching operations, the matching operation may be performed independently of the spoof detecting operation, and vice versa. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   an array of finger sensing pixels operating based upon electric field sensing;
   finger drive circuitry coupled to said array of finger sensing pixels; and
   data acquisition circuitry coupled to said array of finger sensing pixels and configured to
      acquire finger biometric data from each of a plurality of sub-arrays of said array of finger sensing pixels, and
      acquire spoof detection data from at least one of the plurality of sub-arrays by at least sensing an impedance of a finger adjacent said array of finger sensing pixels;
      the data acquisition circuitry configured to acquire the finger biometric data and the spoof detection data in an interleaved fashion.

2. The electronic device of claim 1, wherein said data acquisition circuitry comprises:
   a biometric reading chain configured to acquire the finger biometric data for each finger sensing pixel in a given sub-array; and
   a spoof reading chain configured to buss together respective finger sensing pixels in the given sub-array and acquiring spoof detection data therefrom.

3. The electronic device of claim 2, wherein said biometric reading chain comprises at least one first amplifier and scanning circuitry associated therewith; and wherein said spoof reading chain comprises at least one second amplifier and bussing circuitry associated therewith.

4. The electronic device of claim 1, wherein said finger drive circuitry comprises:
   a finger drive electrode adjacent said array of finger sensing pixels; and
   a pulse generator coupled between said finger drive electrode and said array of finger sensing pixels.

5. The electronic device of claim 1, further comprising a processor coupled to said data acquisition circuitry and configured to determine a finger match and a live finger based upon the finger biometric data and spoof data, respectively.

6. The electronic device of claim 1, wherein each of said finger sensing pixels comprises an electric field finger sensing pixel.

7. The electronic device of claim 1, wherein said data acquisition circuitry is configured to acquire spoof detection data from each of the plurality of sub-arrays.

8. An electronic device comprising:
   an array of electric field finger sensing pixels defining a rectangle; and
   data acquisition circuitry coupled to said array of electric field finger sensing pixels and configured to acquire finger biometric data from each of a plurality of sub-arrays of said array of electric field finger sensing pixels and acquiring spoof detection data from at least one of the plurality of sub-arrays, each of said plurality of sub-arrays extending across a side of the rectangle;
   said data acquisition circuitry configured to acquire the finger biometric data and the spoof detection data in an interleaved fashion;
   said data acquisition circuitry and comprising
      a biometric reading chain configured to acquire the finger biometric data for each electric field finger sensing pixel in a given sub-array, and
      a spoof reading chain configured to buss together respective electric field finger sensing pixels in the given sub-array and acquiring spoof detection data therefrom.

9. The electronic device of claim 8, wherein said biometric reading chain comprises at least one first amplifier and scanning circuitry associated therewith; and wherein said spoof reading chain comprises at least one second amplifier and bussing circuitry associated therewith.

10. The electronic device of claim 8, wherein said spoof reading chain is configured to sense an impedance of a finger positioned adjacent said array of electric field finger sensing pixels.

11. The electronic device of claim 8, wherein said data acquisition circuitry further comprises finger drive circuitry coupled to said array of electric field finger sensing pixels.

12. The electronic device of claim 11, wherein said finger drive circuitry comprises:
   a finger drive electrode adjacent said array of electric field finger sensing pixels; and
   a pulse generator coupled between said finger drive electrode and said array of electric field finger sensing pixels.

13. The electronic device of claim 8, further comprising a processor coupled to said data acquisition circuitry and configured to determine a finger match and a live finger based upon the finger biometric data and spoof data, respectively.

14. The electronic device of claim 8, wherein said data acquisition circuitry is configured to acquire spoof detection data from each of the plurality of sub-arrays.

15. A method of spoof detection comprising:
   using finger drive circuitry coupled to an array of finger sensing pixels; and
   using data acquisition circuitry coupled to an array of finger sensing pixels operating based upon electric field sensing to
      acquire finger biometric data from each of a plurality of sub-arrays of the array of finger sensing pixels, and
      acquire spoof detection data from at least one of the plurality of sub-arrays by at least sensing an impedance of a finger adjacent the array of finger sensing pixels;
   the data acquisition circuitry being used to acquire the finger biometric data and the spoof detection data in an interleaved fashion.

16. The method of claim 15, wherein using the data acquisition circuitry comprises:
   using a biometric reading chain to acquire the finger biometric data for each finger sensing pixel in a given sub-array; and
   using a spoof reading chain to bus together respective finger sensing pixels in the given sub-array and acquiring spoof detection data therefrom.

17. The method of claim 15, further comprising using a processor coupled to the data acquisition circuitry to determine a finger match and a live finger based upon the finger biometric data and spoof data, respectively.

* * * * *